(12) United States Patent
Zhu et al.

(10) Patent No.: US 12,147,662 B2
(45) Date of Patent: *Nov. 19, 2024

(54) TECHNIQUES FOR IMAGE-BASED SEARCH USING TOUCH CONTROLS

(71) Applicant: Intel Corporation, Santa Clara, CA (US)

(72) Inventors: Junmin Zhu, Shanghai (CN); Hongbo Min, Shanghai (CN); Ningxin Patrick Hu, Shanghai (CN); Yongsheng Zhu, Shanghai (CN); Zhiqiang Nelson Yu, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/084,191

(22) Filed: Dec. 19, 2022

(65) Prior Publication Data
US 2023/0152962 A1 May 18, 2023

Related U.S. Application Data

(63) Continuation of application No. 17/206,317, filed on Mar. 19, 2021, now Pat. No. 11,592,980, which is a (Continued)

(51) Int. Cl.
*G06F 3/04883* (2022.01)
*G06F 3/041* (2006.01)
(Continued)

(52) U.S. Cl.
CPC ........ *G06F 3/04883* (2013.01); *G06F 3/0412* (2013.01); *G06F 3/0481* (2013.01);
(Continued)

(58) Field of Classification Search
CPC .. G06F 3/04883; G06F 3/0412; G06F 3/0481; G06F 3/04842; G06F 16/532; G06F 16/951; G06V 10/235; G06V 20/20
See application file for complete search history.

(56) References Cited

U.S. PATENT DOCUMENTS

| 5,485,565 A | * | 1/1996 | Saund | G06F 3/04883 |
| | | | | 345/442 |
| 2003/0179235 A1 | * | 9/2003 | Saund | G06F 3/0481 |
| | | | | 715/764 |

(Continued)

OTHER PUBLICATIONS

"Video Database Retrieval Based on Gestures and Its Application by Manabu Kuramoto, Toshihiro Masaki, Yoshifumi Kitamura, and Fumio Kishino" (hereinafter Manabu) IEEE Transactions On Multimedia, vol. 4, No. 4, Dec. 2002 (Year: 2002).*

*Primary Examiner* — Pei Yong Weng
(74) *Attorney, Agent, or Firm* — KDW Firm PLLC

(57) ABSTRACT

Techniques for image-based search using touch controls are described. An apparatus may comprise: a processor circuit; a gesture component operative on the processor circuit to receive gesture information from a touch-sensitive screen displaying an image and generate a selection area corresponding to the gesture information; a capture component operative on the processor circuit to extract an image portion of the image corresponding to the selection area; and a search component operative on the processor circuit to perform an image-based search using the extracted image portion. Other embodiments are described and claimed.

15 Claims, 15 Drawing Sheets

Related U.S. Application Data continuation of application No. 15/918,050, filed on Mar. 12, 2018, now Pat. No. 10,976,920, which is a continuation of application No. 13/997,225, filed as application No. PCT/CN2013/071254 on Feb. 1, 2013, now Pat. No. 9,916,081.

(51) Int. Cl.
| | |
|---|---|
| *G06F 3/0481* | (2022.01) |
| *G06F 3/04842* | (2022.01) |
| *G06F 16/532* | (2019.01) |
| *G06F 16/951* | (2019.01) |
| *G06V 10/22* | (2022.01) |
| *G06V 20/20* | (2022.01) |

(52) U.S. Cl.
CPC ........ *G06F 3/04842* (2013.01); *G06F 16/532* (2019.01); *G06F 16/951* (2019.01); *G06V 10/235* (2022.01); *G06V 20/20* (2022.01)

(56) References Cited

U.S. PATENT DOCUMENTS

| | | | | |
|---|---|---|---|---|
| 2008/0177640 | A1* | 7/2008 | Gokturk | G06Q 30/02 |
| | | | | 705/26.62 |
| 2012/0197857 | A1* | 8/2012 | Huang | G06F 16/436 |
| | | | | 707/706 |
| 2014/0019431 | A1* | 1/2014 | Suleyman | G06F 16/583 |
| | | | | 707/706 |

* cited by examiner

TECHNIQUES FOR IMAGE-BASED SEARCH USING TOUCH CONTROLS

CROSS-REFERENCE TO RELATED APPLICATIONS

This application is a continuation of, claims the benefit of and priority to previously filed U.S. patent application Ser. No. 17/206,317, filed Mar. 19, 2021, entitled "TECHNIQUES FOR IMAGE-BASED SEARCH USING TOUCH CONTROLS", which is a continuation of, claims the benefit of and priority to previously filed U.S. patent application Ser. No. 15/918,050, filed Mar. 12, 2018, issued Apr. 13, 2021 as U.S. Pat. No. 10,976,920, which is a continuation of, claims the benefit of and priority to previously filed U.S. patent application Ser. No. 13/997,225, filed Jun. 22, 2013, issued Mar. 13, 2018 as U.S. Pat. No. 9,916,081, which is a national stage application claiming the benefit of and priority to International Application No. PCT/CN2013/071254, filed Feb. 1, 2013, which are hereby incorporated by reference in their entireties.

BACKGROUND

Touch-based devices, such as smart phones, personal digital assistants (PDAs), and tablets are increasingly being used for a wide variety of tasks. In particular, the relatively-large screen sizes made possible by using the screen for both input and output has made viewing media on touch-based devices practical and popular. However, tasks previously performed using the keyboard and/or mouse may not have clear analogues on touch-based devices. In parallel, image-based searching has developed into an increasingly popular tool. Image-based searching allows users to use an image, rather than text, as the basis for an Internet search. However, image-based search has relied on keyboard-and-mouse controls for its implementation, making it unavailable or inconvenient on a mobile device. As such, solutions for image-based search using touch controls are desirable. It is with respect to these and other considerations that the present improvements have been needed.

DETAILED DESCRIPTION

Figure 1:
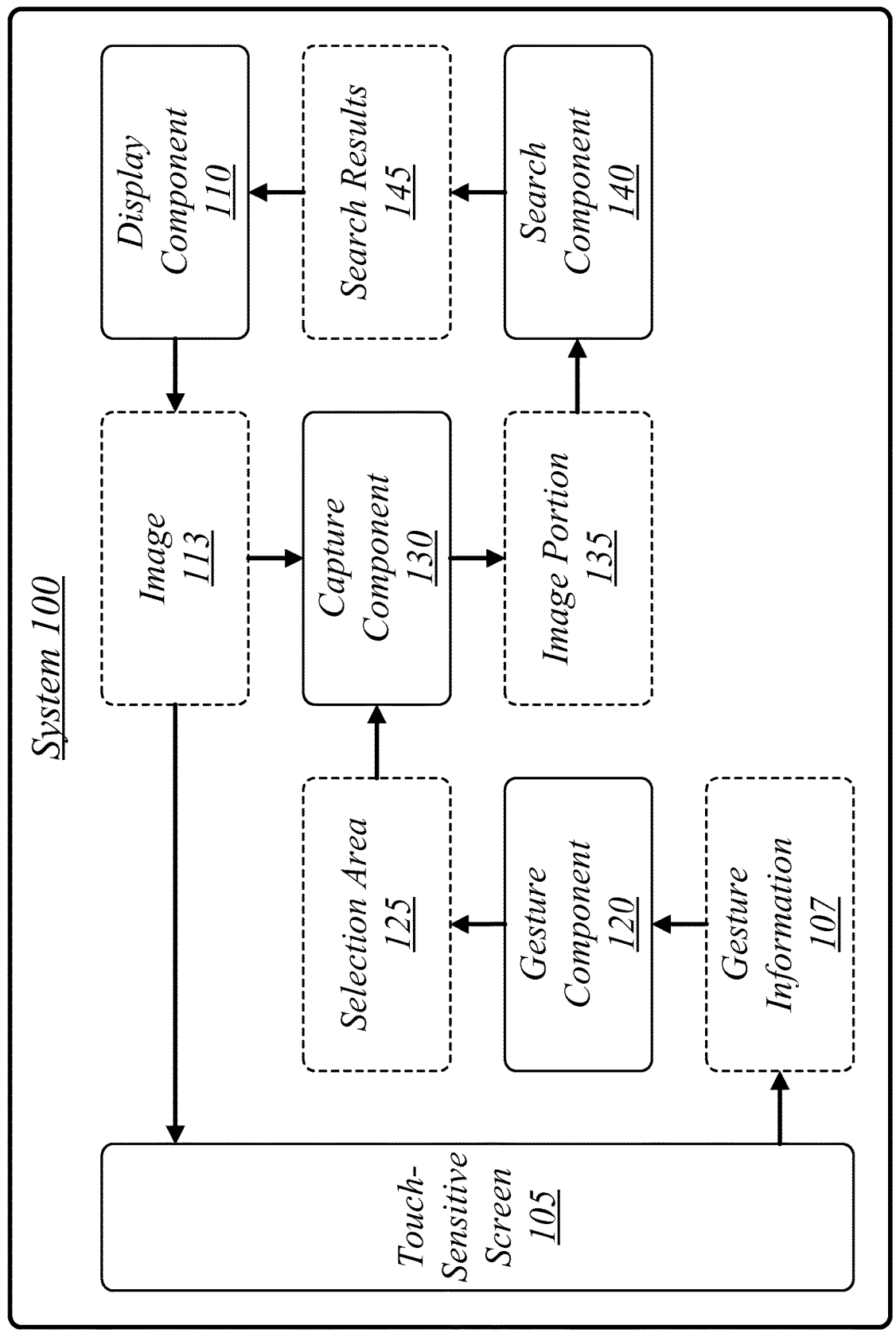
FIG. 1 illustrates an embodiment of a system for image-based search using touch controls.

Various embodiments are directed to techniques for image-based search using touch controls. Traditional, text-based Internet search takes as its user input one or more text fields which it uses in the generation of its search results. In contrast, image-based Internet search takes as at least one of its user inputs an image which it uses in the generation of its search results. An image-only Internet search is an Internet search which uses an image as the only user input for its search. In this context, "user input" refers to the information submitted by a user, or, from another perspective, an application acting on behalf of the user, to the search system. This distinguishes the input specific to a given user's search from the information gathered about Internet resources generally used by the search system from which the system draws its search results. As search systems have introduced image-based search and expanded its usefulness, users have taken an increasing interest in performing image-based search.

With the rising popularity of smart phones, tablets, and PDAs, users are increasingly performing a wide variety of tasks using touch-based controls on touch-sensitive screens. Touch-based controls are user controls in which applications receive user commands through a user pressing one or more fingers on a portion of a computing device operative to detect user touches. Typical user inputs include one or more taps and swipes, with a tap corresponding to a press that does not slide across the touch-sensitive portion of the computing device, and a swipe corresponding to a press that does slide across the touch-sensitive portion of the computing device. A touch-sensitive screen is a hardware component capable of using the same surface as both a display and as a touch-sensitive input. By combining input and output into the same surface, the area used for each of input and output can be made greater than if the two did not overlap. Further, because a user enters commands using the display, the positioning of the taps and swipes of the commands may correspond directly to the on-screen position of user interface elements and displayed content. As such, touch-based user commands may be interpreted in a manner responsive to the content displayed beneath them.

The relatively large display areas of devices with touch-sensitive screens makes them particularly appropriate and popular for the display of media content, such as still images and video. Further, users viewing such content may desire to receive information regarding some element of a displayed image or video. However, existing interfaces are poorly adapted to provide such functionality to a user. As such, it is desirable to have a single user command to select a portion of a displayed image or video and automatically instantiate an image-based search. Such a command empowers the viewer of an image or video to easily request more information regarding a portion of the displayed image or video. As a result, the embodiments can improve the utility of a device with a touch-sensitive screen.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100 for image-based search using touch controls. In one embodiment, the system 100 may comprise a computer-implemented system 100 comprising one or more components. Although the system 100 shown in FIG. 1 has a limited number of elements in a certain topology, it may be appreciated that the system 100 may include more or less elements in alternate topologies as desired for a given implementation.

The system 100 may comprise a touch-sensitive screen 105. The touch-sensitive screen 105 may be generally operative to both display output to a user and to receive touch commands from the user on the same surface. The touch-sensitive screen 105 may be operative to receive an image 113 for display on the screen and to display the image 113 as either the entirety of the display area or in a portion of the display area. The touch-sensitive screen 105 may be operative to detect objects, such as human fingers, positioned on a surface of the touch-sensitive screen 105. Touch commands may comprise one or more touch-points corresponding to the locations of one or more substantially-simultaneous finger presses on the touch-sensitive screen 105 by a user of the system 100. Touch commands may comprise one or more substantially-simultaneous swipes of one or more touch-points across the touch-sensitive screen 105. The touch-sensitive screen 105 may be operative to provide gesture information 107 based on detected touch commands.

The system 100 may comprise a display component 110. The display component 110 may be generally operative to display an image 113 on the touch-sensitive screen 105. The display component 110 displaying an image 113 on the touch-sensitive screen 105 corresponds to the display component 110 transmitting the image 113 to the touch-sensitive screen 105 for display, either as a portion or a whole of the touch-sensitive screen 105 display. In some embodiments, the image 113 may comprise a frame from a video, the image 113 presented as part of a playback of the video. The playback of the video may be carried out by an application or a plug-in running within an application such as a web browser, the application or plug-in presenting the video on the touch-sensitive screen 105.

The system 100 may comprise a gesture component 120. The gesture component 120 may be generally operative to receive gesture information 107 from the touch-sensitive screen 105 displaying the image 113. The gesture component 120 may be operative to recognize a scratch gesture based on the received gesture information 107. The gesture component 120 may be operative to generate a selection area 125 corresponding to the gesture information 107. The gesture component 120 may be operative to generate a selection area 125 corresponding to the scratch gesture.

A scratch gesture refers to a specific touch-based user command indicating the user's intention that a portion of an image 113 be used as the input for an image-based search. In various embodiments, different touch-based user command indicating an area of the screen may be used as a scratch gesture. However, in some embodiments, the scratch gesture may comprise a substantially-parallel substantially-simultaneous swipe of a plurality of touch-points downwards across the touch-sensitive screen 105. A swipe of touch points may be said to be substantially-parallel if the paths of travel of the touch points do not differ in angle beyond a pre-defined threshold, such as 5°, 10°, 25°, or 30°. A given swipe, by virtue of being the result of a user dragging a finger across the touch-sensitive screen 105, occurs over a period of time. A swipe of a plurality of touch points may be said to be substantially-simultaneous if the plurality of periods of time during which the plurality of swipes are recorded overlap with each other. A swipe of plurality of touch points may be said to be downwards if the paths of travel of each of the touch points corresponds to the direction from the top of the touch-sensitive screen 105 to the bottom within a pre-defined threshold, such as 5°, 10°, 25°, or 30°. It will be appreciated that as some touch-sensitive devices allow for viewing in a variety of orientations that the directions corresponding to the top and bottom of the touch-sensitive screen 105 may depend on the orientation of the device. Generally, the top of the computing device 220 may correspond to the side of the device above the video 220.

The selection area 125 represents an attempt to capture the intended subject of a user's gesture. In some embodiments, the selection area 125 may comprise a rectangle. The rectangle may be a minimized rectangle bounding the scratch gesture. In some embodiments, each of the swipes of touch points may be represented by a pair of points, wherein each point comprises an x-coordinate and a y-coordinate. This pair of points may correspond to the touch points recorded for the beginning and end of each swipe. The minimized rectangle may be calculated as traversing the portion of the touch-sensitive screen 105 which minimally bounds the swipes of touch points. The horizontal extent of the minimized rectangle spans from the minimum x-coordinate of the plurality of x-coordinates of the pairs of points for the plurality of swipes to the maximum x-coordinates of the same plurality. The vertical extent of the minimized rectangle spans from the minimum y-coordinate of the plurality of y-coordinates of the pairs of points for the plurality of swipes to the maximum y-coordinates of the same plurality.

The system 100 may comprise a capture component 130. The capture component 130 may be generally operative to extract an image portion 135 of the image 113 corresponding to the selection area 125. The image portion 135 contains the portion of the image 113 contained within the selection area 125.

The system 100 may comprise a search component 140. The search component 140 may be generally operative to perform an image-based search using the extracted image portion 135. The image-based search may produce search results 145, which may be transmitted to display component 110 for display to the user on the touch-sensitive screen 105.

Figure 2:
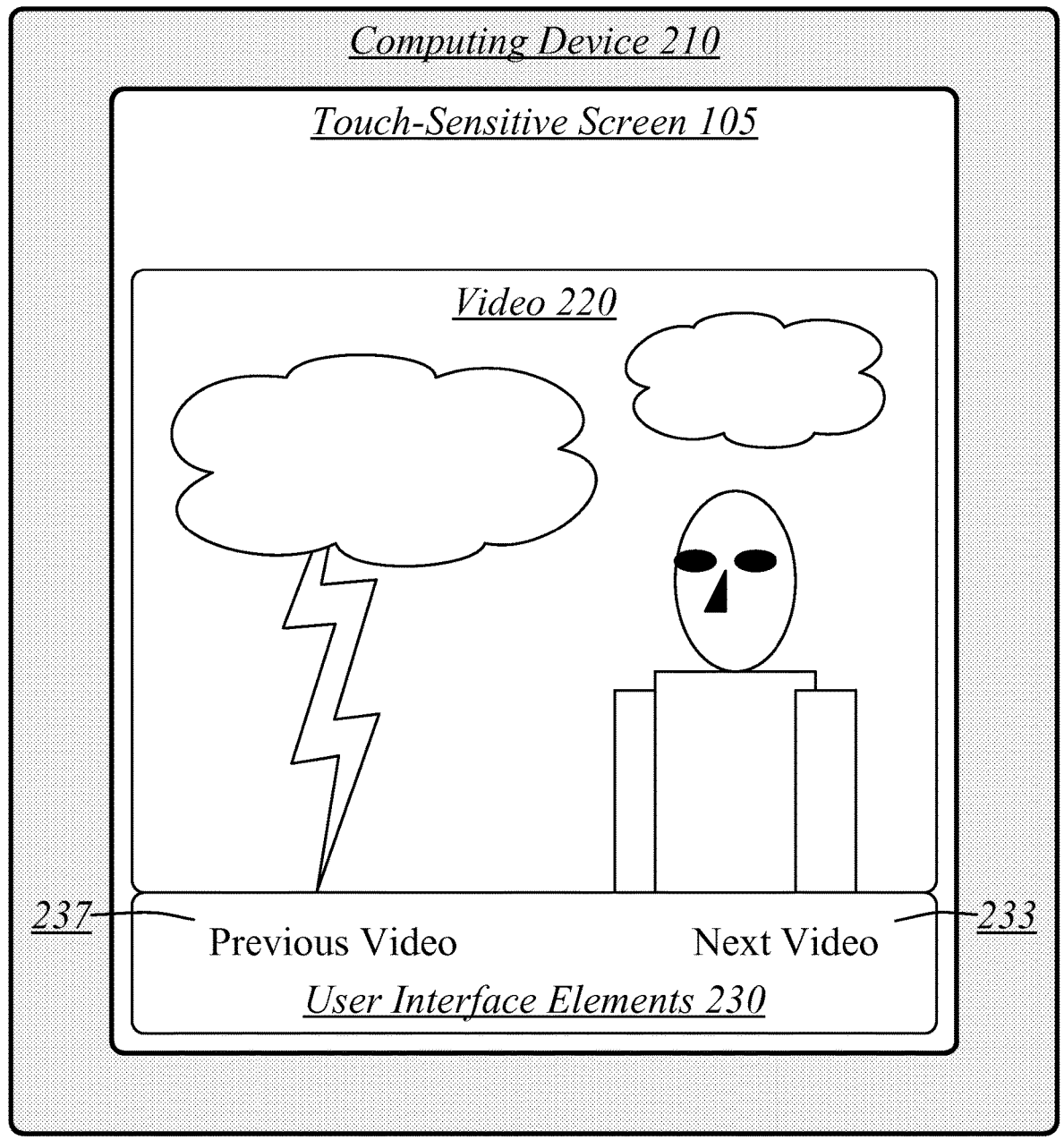
FIG. 2 illustrates an example interface for video playback on a computing device.

FIG. 2 illustrates an example interface for video playback on a computing device. As shown in FIG. 2, a computing device 210 with a touch-sensitive screen 105 is displaying a video 220 of a robot standing against the backdrop of a lightning storm. With reference to FIG. 1, a frame of the video 220 may correspond to an image 113 as transmitted from the display component 110 to the touch-sensitive screen 105. Associated with the video 220 are user interface elements 230, comprising a previous video button 237 and a next video button 233. As illustrated, the user interface elements 230 do not overlap with the displayed video 220 but rather are positioned beneath it.

In some instances, the video 220 may comprise a video being played back by a media application on the computing device 210. In others, the video 220 may comprise a video being played back by a media plug-in of an Internet application, such as a web browser. As such, in some instances the video 220 may be a locally-stored video and in other instances the video 220 may be a video stream received over the Internet. A video received over the Internet may be received via any of the known methods of receiving video over the Internet, such as through a wired connection, a wireless connection, or a cellular data connection.

In some embodiments, the computing device 210 may comprise a mobile device such as a mobile phone, smart phone, or tablet. In some embodiments, the computing device 210 may comprise a non-mobile desktop device, such as a personal computer or media appliance with a touch-sensitive screen 105.

It will be appreciated that the depicted user interface including user interface elements 230 is merely one possible user interface and that the discussed techniques are appropriate to a variety of user interface elements and layouts.

Figure 3:
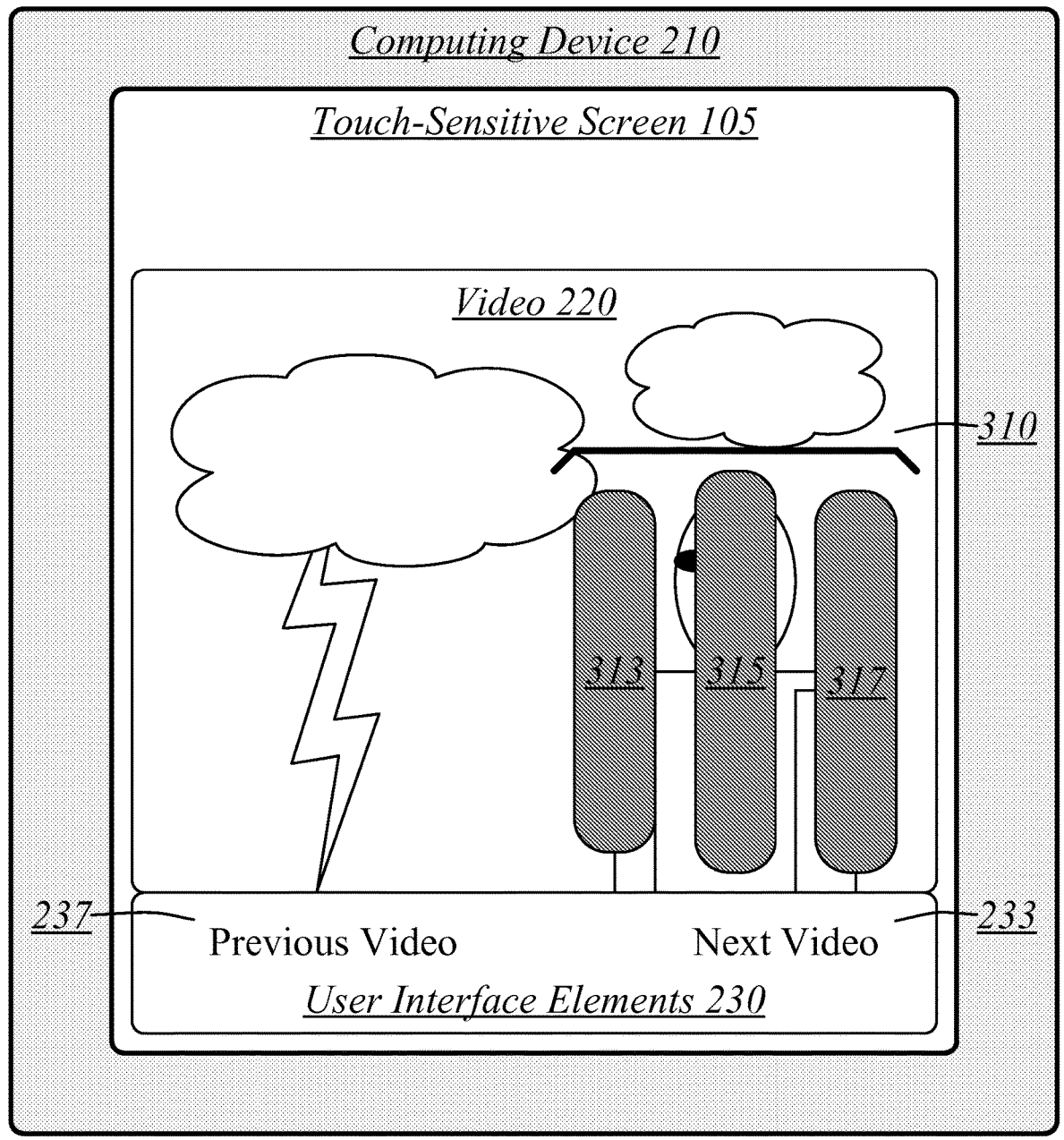
FIG. 3 illustrates an example reception of a touch-based command on the computing device of FIG. 2.

FIG. 3 illustrates an example reception of a touch-based command on the computing device of FIG. 2. As shown in FIG. 3, a user has performed a scratch gesture 310 comprising the substantially-parallel substantially-simultaneous swipes of a plurality, specifically three, of touch points: 313, 315, and 317. As can be seen, scratch gesture 310 corresponds generally to the location of the depicted robot and thereby communicates a user's desire to perform an image-based search of the depicted robot.

The nature of the scratch gesture may vary in various embodiments. In general, the scratch gesture may comprise any gesture indicating a particular area of the touch-sensitive screen 105 for an image-based search. Generally, the received gesture information 107 may consist of a plurality of touch-points organized individually and/or in groups. An individual touch-point may correspond to a touch-point representing a single press, rather than a swipe, on the touch-sensitive screen 105. Grouped touch-points may correspond to a plurality of touch-points collectively representing a swipe across the touch-sensitive screen 105, such that the plurality of touch-points describe a line or path corresponding to the swipe across the touch-sensitive screen 105.

Figure 4:
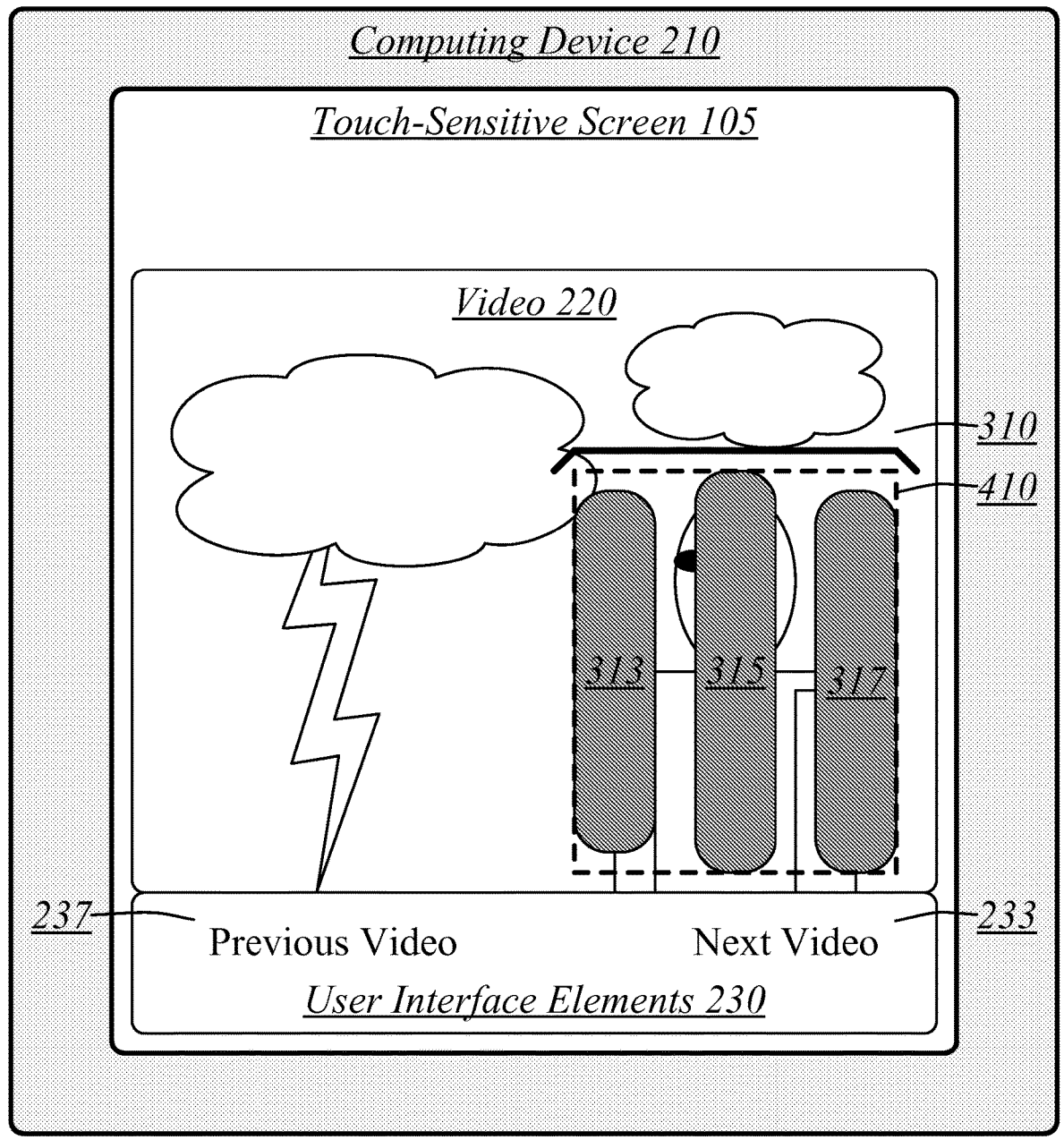
FIG. 4 illustrates the generation of a selection area based on the touch-based command of FIG. 3.

FIG. 4 illustrates the generation of a selection area 125 based on the touch-based command of FIG. 3. As shown in FIG. 4, a selection area 410 has been determined bounding the scratch gesture 310. The selection area 410 is the minimized rectangle bounding the scratch gesture 310. In some embodiments, each of the swipes of touch points may be represented by a pair of points, wherein each point comprises an x-coordinate and a y-coordinate. This pair of points may correspond to the touch points recorded for the beginning and end of each swipe. The minimized rectangle may be calculated as traversing the portion of the touch-sensitive screen 105 which minimally bounds the swipes of touch points. The horizontal extent of the minimized rectangle spans from the minimum x-coordinate of the plurality of x-coordinates of the pairs of points for the plurality of swipes to the maximum x-coordinates of the same plurality. The vertical extent of the minimized rectangle spans from the minimum y-coordinate of the plurality of y-coordinates of the pairs of points for the plurality of swipes to the maximum y-coordinates of the same plurality.

In general, the minimized rectangle may bound the received gesture information 107. As discussed, the gesture information 107 may consist of a plurality of touch-points. Each touch-point may be associated with an x-coordinate and a y-coordinate. The minimized rectangle may be calculated as traversing the portion of the touch-sensitive screen 105 which minimally bounds the plurality of touch points. The horizontal extent of the minimized rectangle spans from the minimum x-coordinate of the plurality of x-coordinates of the plurality of touch points to the maximum x-coordinates of the same plurality. The vertical extent of the minimized rectangle spans from the minimum y-coordinate of the plurality of y-coordinates of the plurality of touch points to the maximum y-coordinates of the same plurality.

Figure 5:
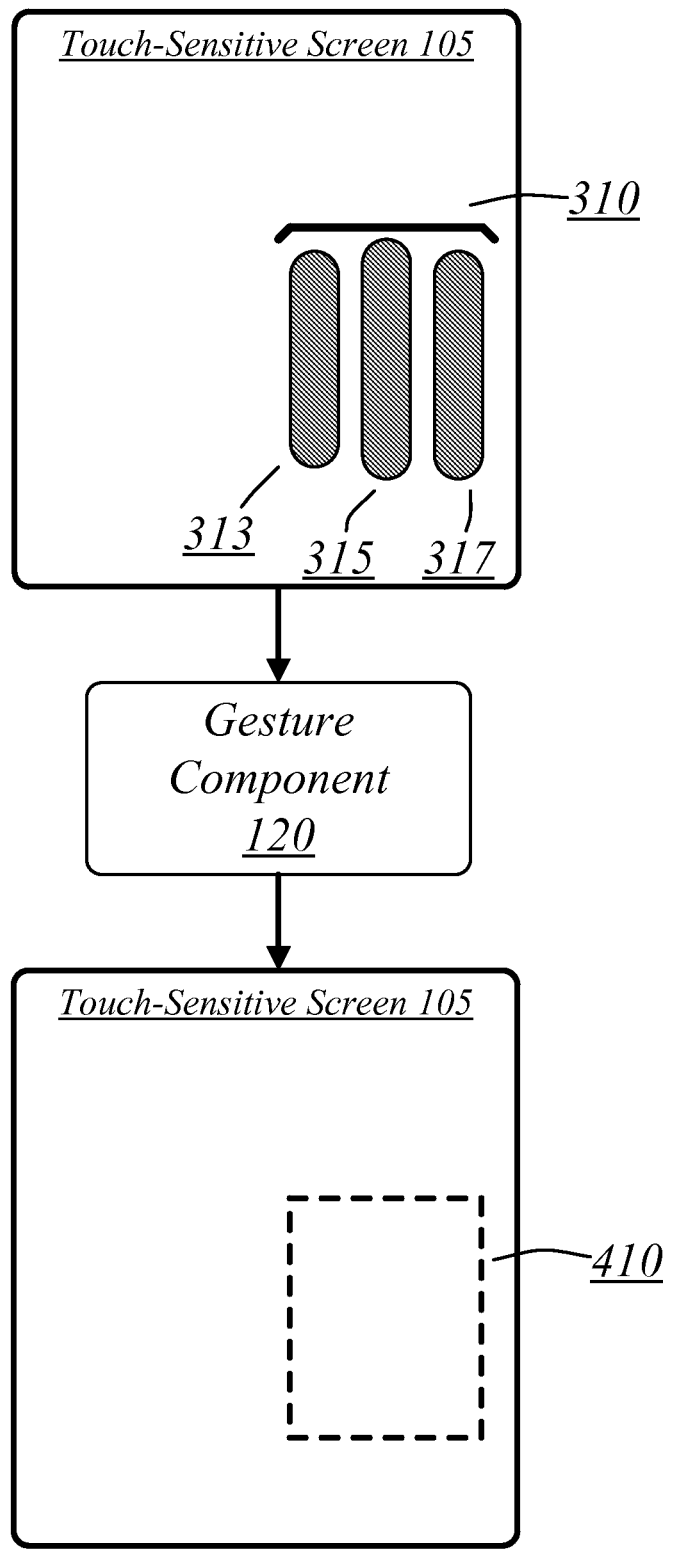
FIG. 5 illustrates a second view of the generation of a selection area.

FIG. 5 illustrates a second view of the generation of a selection area 125. As shown in FIG. 5, the gesture component 120 receives gesture information 107 comprising the scratch gesture 310 composed of the substantially-parallel substantially-simultaneous swipes of a plurality of touch-points 313, 315, and 317 downwards across the touch-sensitive screen 105. Based on the gesture information 107, the gesture component 120 generates the selection area 410 as a minimized rectangle bounding the scratch gesture 310.

Figure 6:
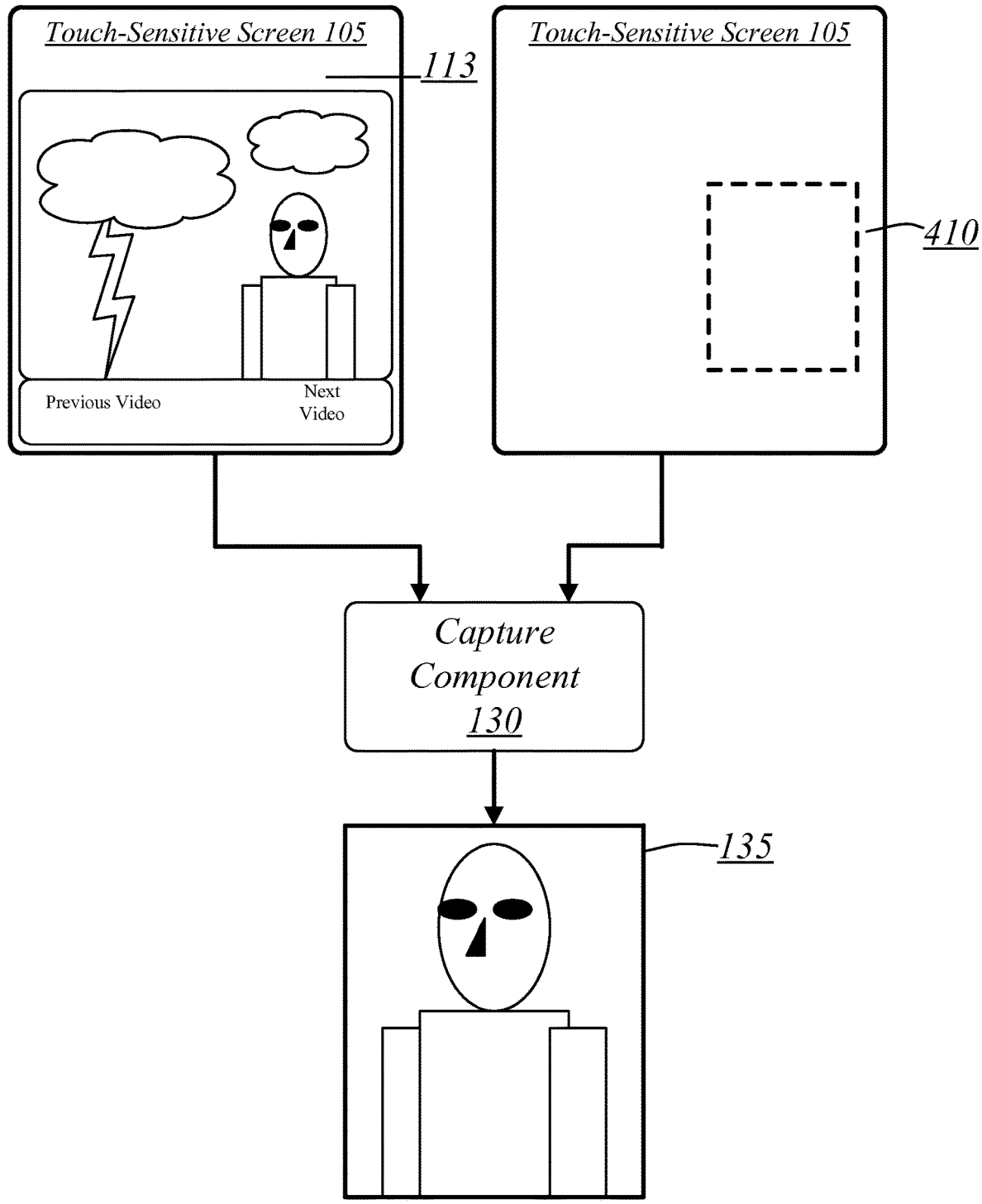
FIG. 6 illustrates the extraction of an image portion.

FIG. 6 illustrates the extraction of an image portion. As shown in FIG. 6, the capture component 130 receives the image 113 displayed on the touch-sensitive screen 105 and the selection area 410 as determined from the scratch gesture 310. The capture component 130 extracts the portion of the image 113 corresponding to the selection area 410 to produce the image portion 135 containing the portion of the image 113 contained within the selection area 410. As shown, the user has selected an image portion 135 of the image 113 from video 220 depicting the robot.

Figure 7:
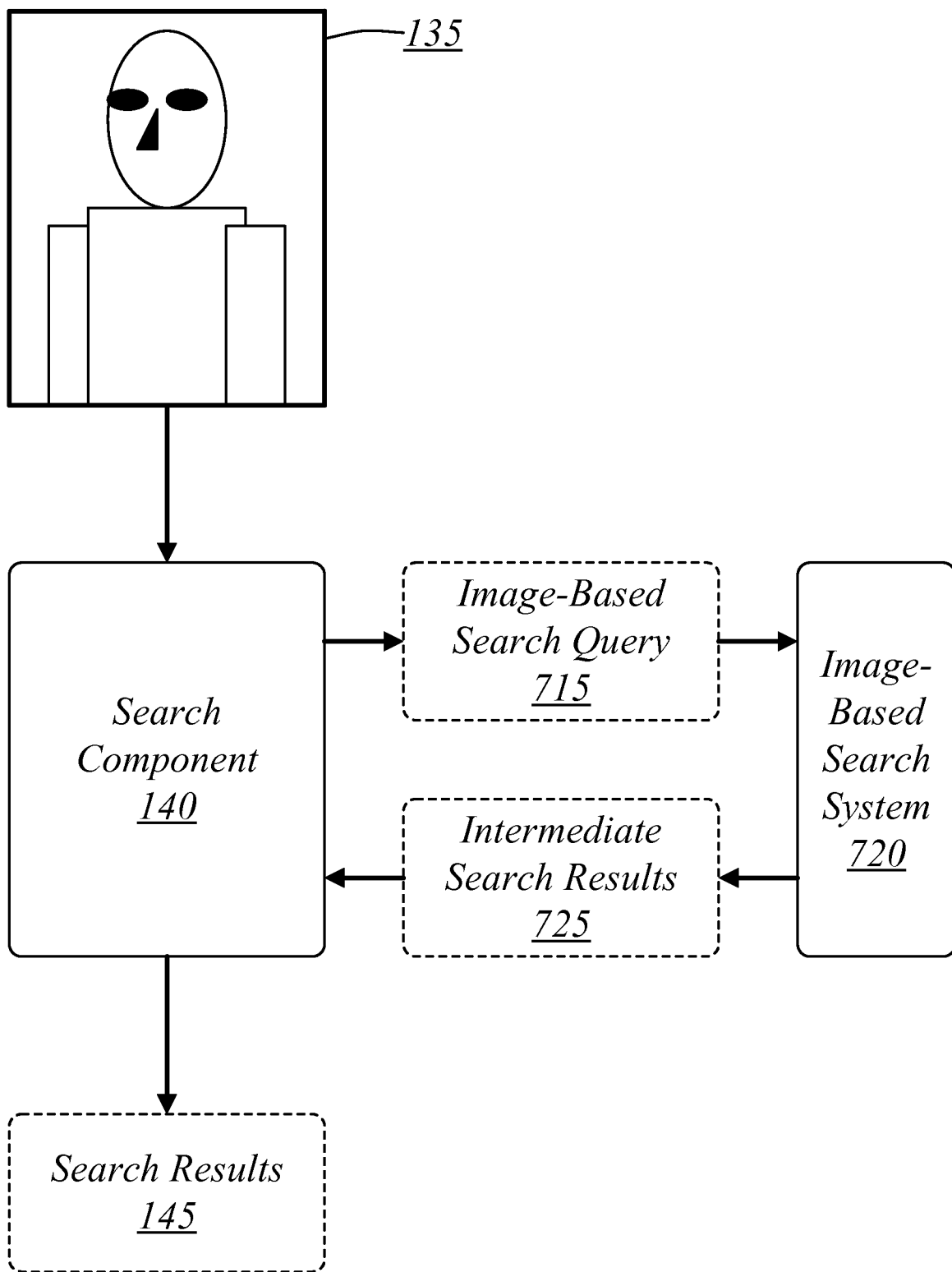
FIG. 7 illustrates the generation of search results using an extracted image portion.

FIG. 7 illustrates the generation of search results using an extracted image portion. As shown in FIG. 7, the search component 410 receives the image portion 135 extracted by the capture component 130. The search component 140 composes an image-based search query 715 from the image portion 135 as appropriate for image-based search system 720. The image-based search system 720 may consist of any Internet-accessible search system operative to receive an image as a search term. Composing an image-based search query 715 appropriate for the image-based search system 720 involves the generation of a query formatted according to the requirements of the image-based search system 720 containing the image portion 135. The image-based search query 715 is transmitted to the image-based search system 720, such as by transmitting the image-based search query 715 across the Internet to the image-based search system 720.

The image-based search using the image-based search system 720 is automatically initiated in response to the reception of the gesture information 107 indicating a user desire to perform an image-based search on a selected area. The reception of the recognized user command automatically initiates the identification of the selected area, the extraction of the associated image data, the initiation of the search, and the displaying of the results to the user. The automatic initiation of this multi-step process from a received gesture conveniences the user by simplifying the process of initiating the image-based search.

The image-based search query 715 may comprise an image-only Internet search. Alternatively, the image-based search query 715 may comprise an image-based Internet search also containing textual information. In some embodiments, the search component 140 may be operative to include contextual information related to image 113 or video 220 as part of the image-based search query 715. Contextual information related to image 113 may comprise the name of the video 220 being displayed. For example, if image 113 is a frame from the movie The Day the Earth Stood Still (1951) being presented as video 220 then the text "The Day the Earth Stood Still (1951)" may be included as a portion of image-based search query 715.

In some instances, a general Internet or World Wide Web search may be requested from the image-based search system 720. However, in other instances, a specialized image-based search system 720 may be used. For example, such as where image 113 is extracted from a video 220 that comprises a movie, a movie-specific image-based search system 720 may be used so as to more specifically find information about a movie, actor, or some other element of a movie. In some embodiments, an image-based content-specific search may be performed in parallel with the general Internet or World Wide Web search. For example, in some embodiments, the gesture may always instantiate an image-based World Wide Web search and also instantiate a movie-specific image-based search when a video 220 being displayed is a movie or feature film. In some embodiments, the gesture may always instantiate an image-based World Wide Web search and also instantiate a television-specific image-based search when a video 220 being displayed is a television show. In these embodiments, the results of these parallel searches may therefore be displayed to the user in parallel with each other.

In response, the search component 140 receives from the image-based search system 720 intermediate search results 725. Intermediate search results 725 consist of image-based search system 720's response to the image-based search query 715. Generally, intermediate search results 725 will consist of a listing of one or more search results formatted according to the standards of image-based search system 720. Search component 140 is operative to receive intermediate search results 725 and translate them to search results 145 according to the standards of system 100. In some embodiments, intermediate search results 725 may consist of HTML, or XML formatted results which may be parsed and translated according to the various techniques known in the art. As shown with reference to FIG. 1, search component 140 may be operative to transmit search results 145 to display component 110 for display on touch-sensitive screen 105 for the user.

The intermediate search results 725 and the search results 145 may comprise a plurality of search results consisting of a plurality of matching images found on the Internet. The search results 145 may comprise a plurality of search results consisting of a plurality of web pages found on the World Wide Web.

Figure 8:
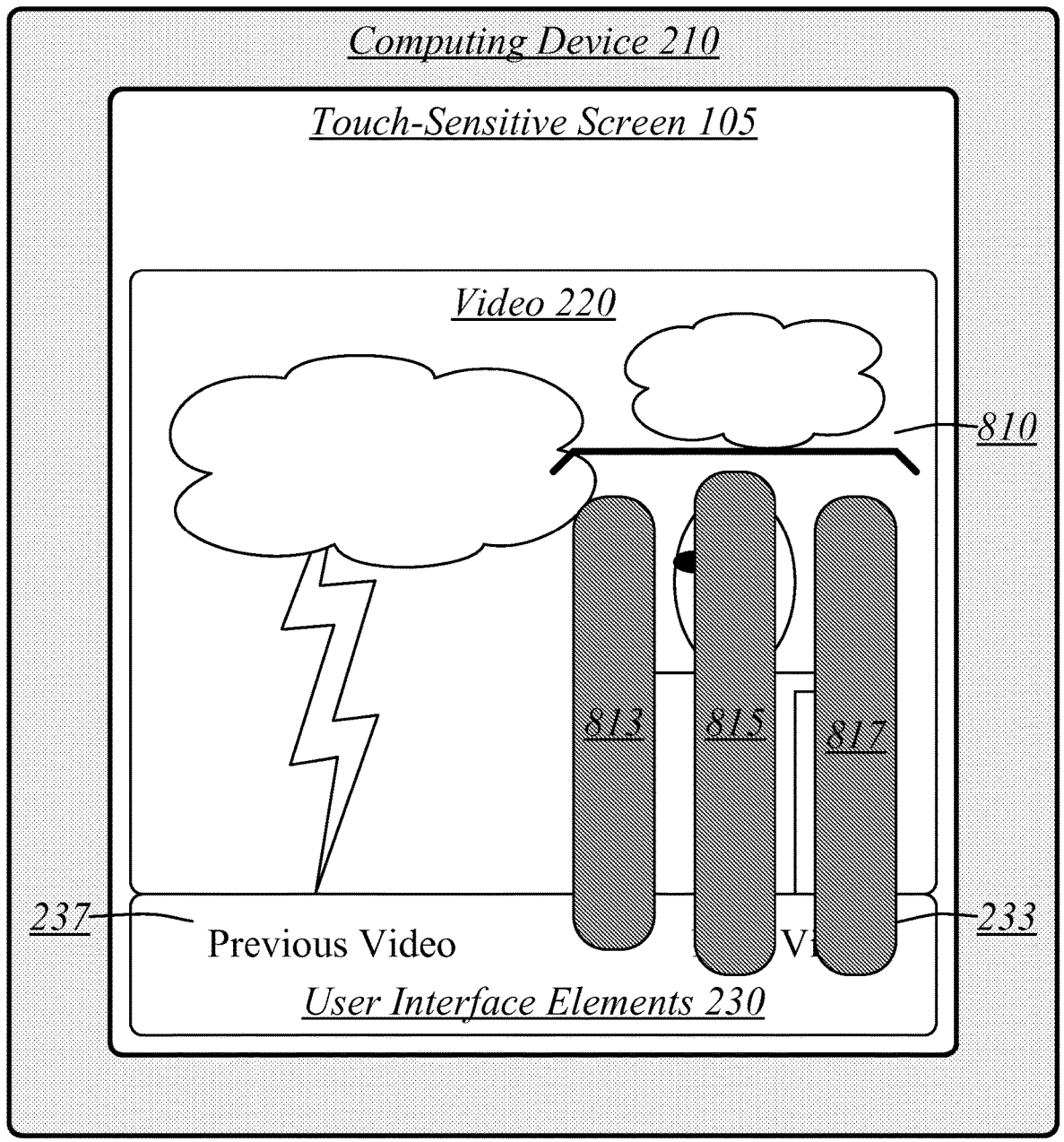
FIG. 8 illustrates a second example reception of a touch-based command on the computing device of FIG. 2.

FIG. 8 illustrates a second example reception of a touch-based command on the computing device of FIG. 2 As shown in FIG. 8, a user has performed a scratch gesture 810 comprising the substantially-parallel substantially-simultaneous swipes of a plurality, specifically three, of touch points: 813, 815, and 817. As before, the scratch gesture 810 corresponds generally to the location of the depicted robot and thereby communicates a desire to perform an image-based search of the depicted robot. However, in this instance the scratch gesture 810 has extended down into the user interface elements 230. Nevertheless, it is unlikely that the user intends to perform an image-based search on a combination of the depicted robot and a portion of the user interface elements 230. Instead, the user has likely extended the scratch gesture 810 beyond their intended selection so as to include the portion of the user interface elements 310 in addition to the robot.

As such, it would be desirable to exclude the portions of the user interface elements 310 covered by the scratch gesture 810 from the generated selection area 125. Therefore, in some embodiments, the image 113 may be displayed in combination with user interface elements 230, the capture component 130 operative to exclude the user interface elements 230 from the extracted image portion 135.

It will be appreciated that, as previously discussed, in some embodiments the gesture command that initiates the image-based search may differ from the one depicted. Despite this difference, the system 100 is still operative to exclude any portion of a derived selection area 410 that overlaps with user interface elements such as user interface elements 230. It will be further appreciated that the system 100 is operative to exclude any user interface elements sharing the screen with the video 220, whether those elements are below, above, or to the side of the video 220.

It will be appreciated that the term "user interface elements" may be used generally to refer to both controls and non-image-or-video content. As such, in addition to excluding video controls adjacent to a video, the system 100 may be operative to exclude text adjacent to an image. For example, an image may be presented along with text, such as in a web page. In these instances, the system 100 may be operative to exclude the text from the selection area 410— may be operative to limit the selection area 410 to just the image content—when the appropriate gesture is used on the image content.

Figure 9:
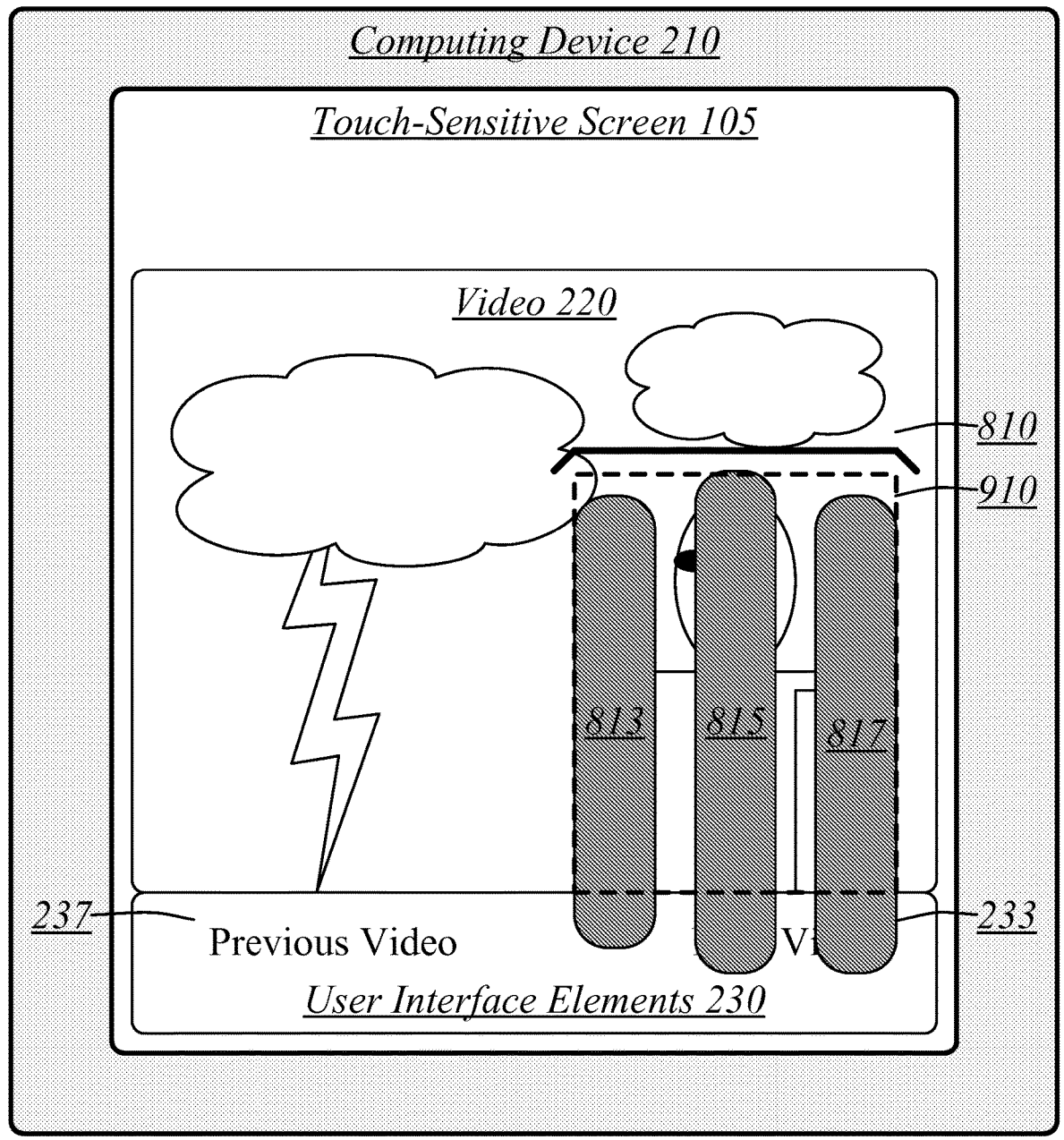
FIG. 9 illustrates the generation of a selection area based on the touch-based command of FIG. 8.

FIG. 9 illustrates the generation of a selection area 910 based on the touch-based command of FIG. 8. As shown in FIG. 9, the selection area 910 limits itself to the portion of touch-sensitive screen 105 displaying video 220, thereby excluding any portion of user interface elements 230. The generation of selection area 910 may comprise determining a minimized rectangle bounding the scratch gesture 810 and then cropping the minimized rectangle to lie entirely within the video 220. The generation of selection area 910 may comprise determining a minimized rectangle bounding the scratch gesture 810 and then cropping the minimized rectangle to exclude any portion of user interface elements 230. As such, the capture component 130 may be generally operative to exclude the user interface elements 230 by constraining the selection area 910 to a portion of the touch-sensitive screen 105 corresponding to the displayed imaged 130.

Figure 10:
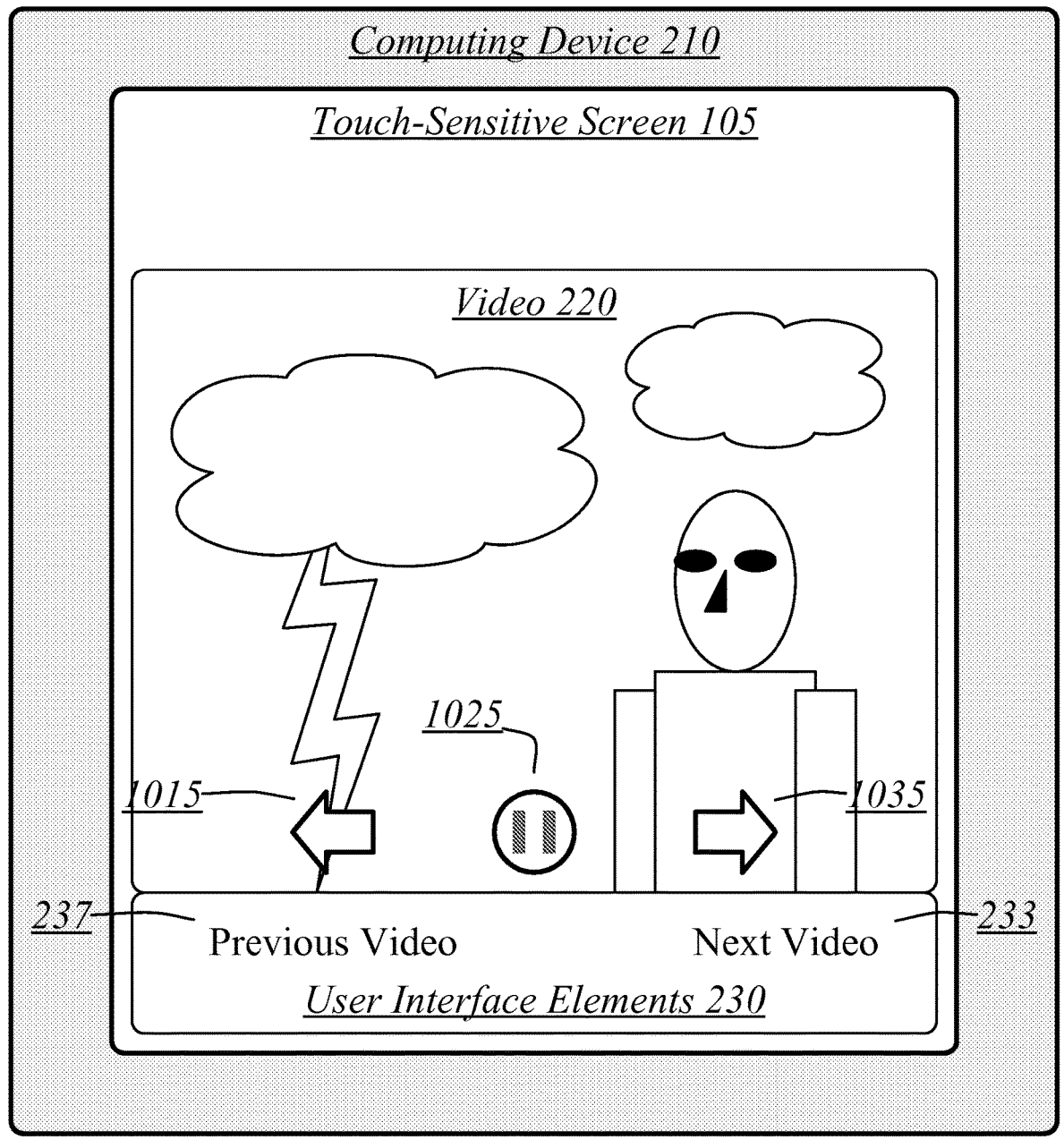
FIG. 10 illustrates a second example interface for video playback on a computing device.

FIG. 10 illustrates a second example interface for video playback on a computing device. As shown in FIG. 10, the user interface now includes overlaid user-interface elements 1015, 1025, and 1035. User interface element 1015 is an overlaid rewind control for video 220. User interface element 1025 is an overlaid pause control for video 220. User interface element 1035 is an overlaid fast-forward control for video 220. As depicted, a user would touch the touch-sensitive screen 105 above the user interface element 1015, 1025, or 1035 in order to produce a touch-press activating the respective control. It will be appreciated that the precise depicted controls and their layout may differ from the depiction.

Figure 11:
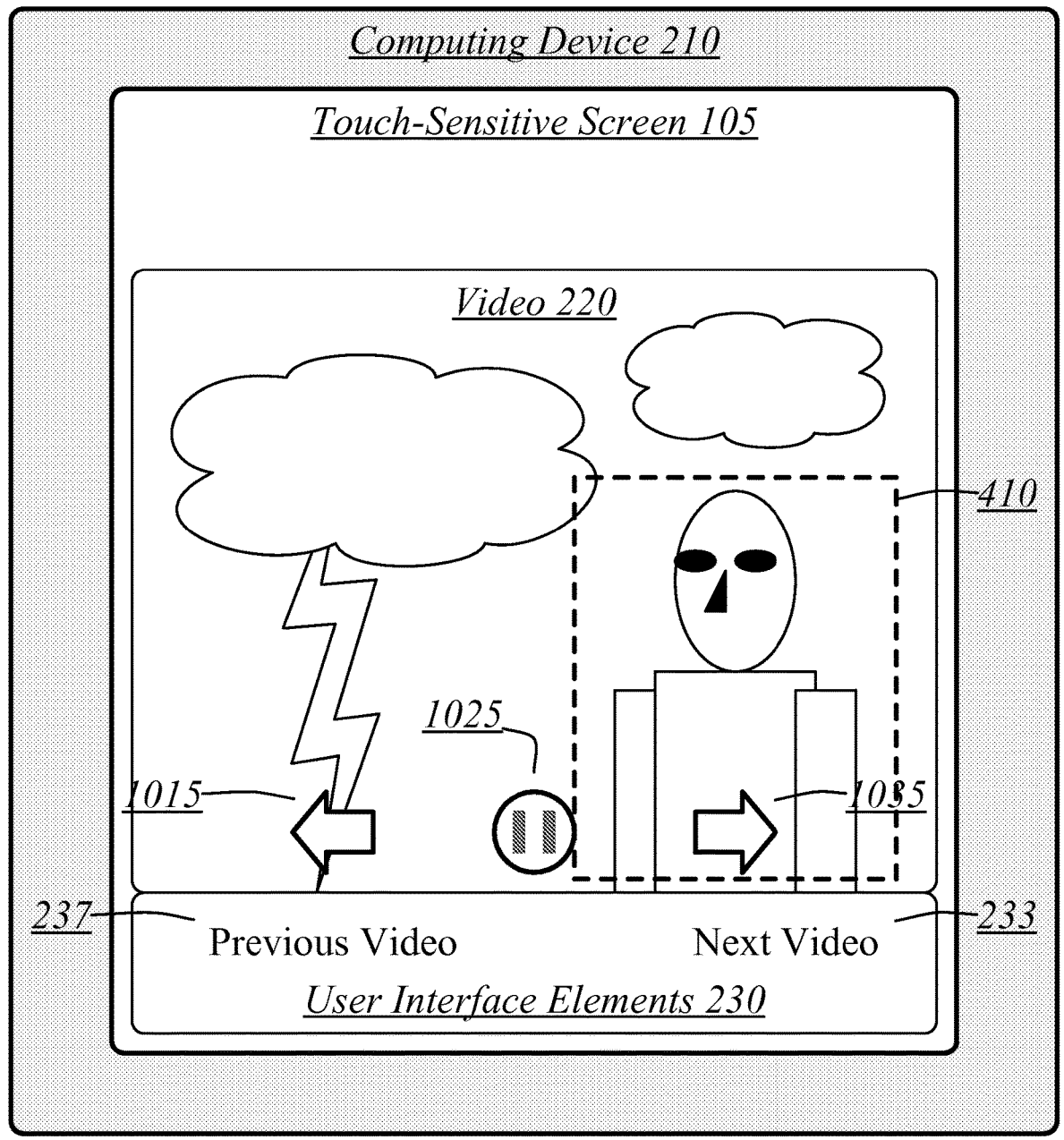
FIG. 11 illustrates a selection area on the second example interface of FIG. 10.

FIG. 11 illustrates a selection area on the second example interface of FIG. 10. With reference to FIG. 3 and FIG. 4, the selection area 410 was generated according to the scratch gesture 310 covering the depicted robot. As shown in FIG. 11, the selection area 410 includes the depicted robot and the fast-forward user interface element 1035. As with the selection of a portion of user interface elements 230—with reference to FIG. 8 an FIG. 9—it is likely that the user does not intend for the requested image-based search to include the fast-forward user interface element 1035. As such, it would be desirable to exclude the fast-forward user interface element 1035 covered by the scratch gesture 310 from the generated selection area 410. However, unlike with the exclusion of user interface elements 230, fast-forward user interface element 1035 is overlaid on top of video 220 and cannot be excluded by cropping the generated selection area 410.

Figure 12:
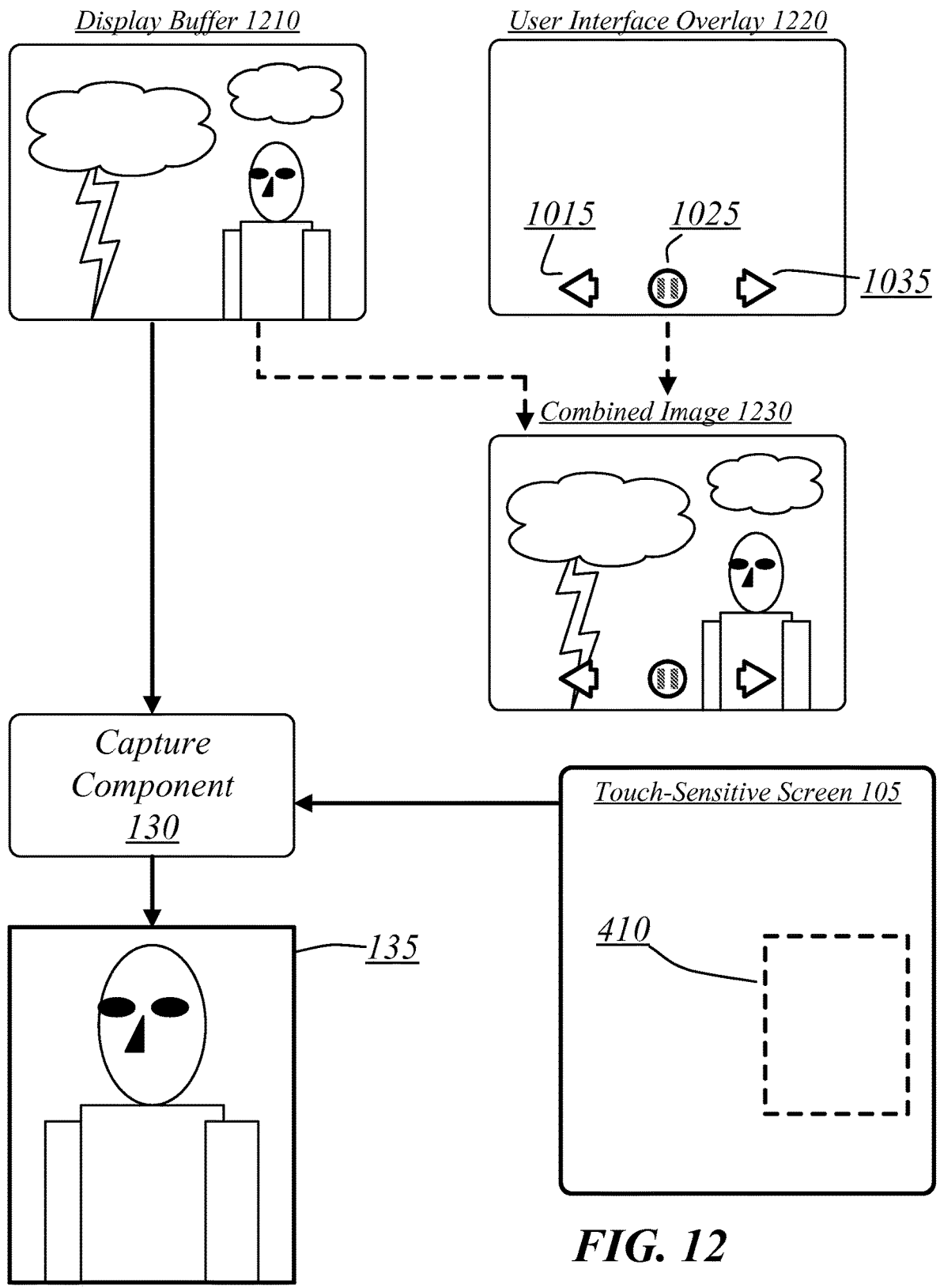
FIG. 12 illustrates the extraction of an image portion in which overlaid user interface elements are excluded from the image portion.

FIG. 12 illustrates the extraction of an image portion in which overlaid user interface elements are excluded from the image portion 135. As shown in FIG. 12, the video 220 is rendered into display buffer 1210, which is combined with the user interface overlay 1220 to produce the combined image 1230. It will be appreciated that the user interface overlay 1220 may comprise any of the known methods for overlaying one or more user interface elements over a displayed image 113 or video 220. The combined image 1230 corresponds to the video 220 as displayed in FIG. 10 and FIG. 11.

The capture component 130 is operative to retrieve the image portion 135 from the display buffer 1210. Given the user interface elements 1015, 1025, and 1035 overlaying the display image 113, the capture component 130 is operative to exclude the user interface elements 1015, 1025, and 1035 by extracting the image portion 135 from the display buffer 1210 storing the image 113 without the overlaid user interface element 1015, 1025, and 1035. It will be appreciated that the capture component 130 may be operative to extract the image portion 135 whether or not any user interface elements are overlaid on top of the image 113. Extracting the image portion 135 from the display buffer 1210 may comprise performing a request to retrieve image data from the display buffer 1210, such as a display buffer 1210 maintained by an image or video program or plugin displaying image 113 or video 220. The image or video program or plugin may return the entirety of image 113 to the capture component 130 which is then operative to crop image 113 to the image portion 135 according to selection area 410.

It will be appreciated that, as previously discussed, in some embodiments the gesture command that initiates the image-based search may differ from the one depicted. Despite this difference, the system 100 is still operative to exclude from the extracted image portion 135 any overlaid user interface elements such as the depicted elements 1015, 1025, and 1035. It will be appreciated that the system 100 is operative to do so despite the specific functionality and layout of overlaid user interface elements.

Figure 13:
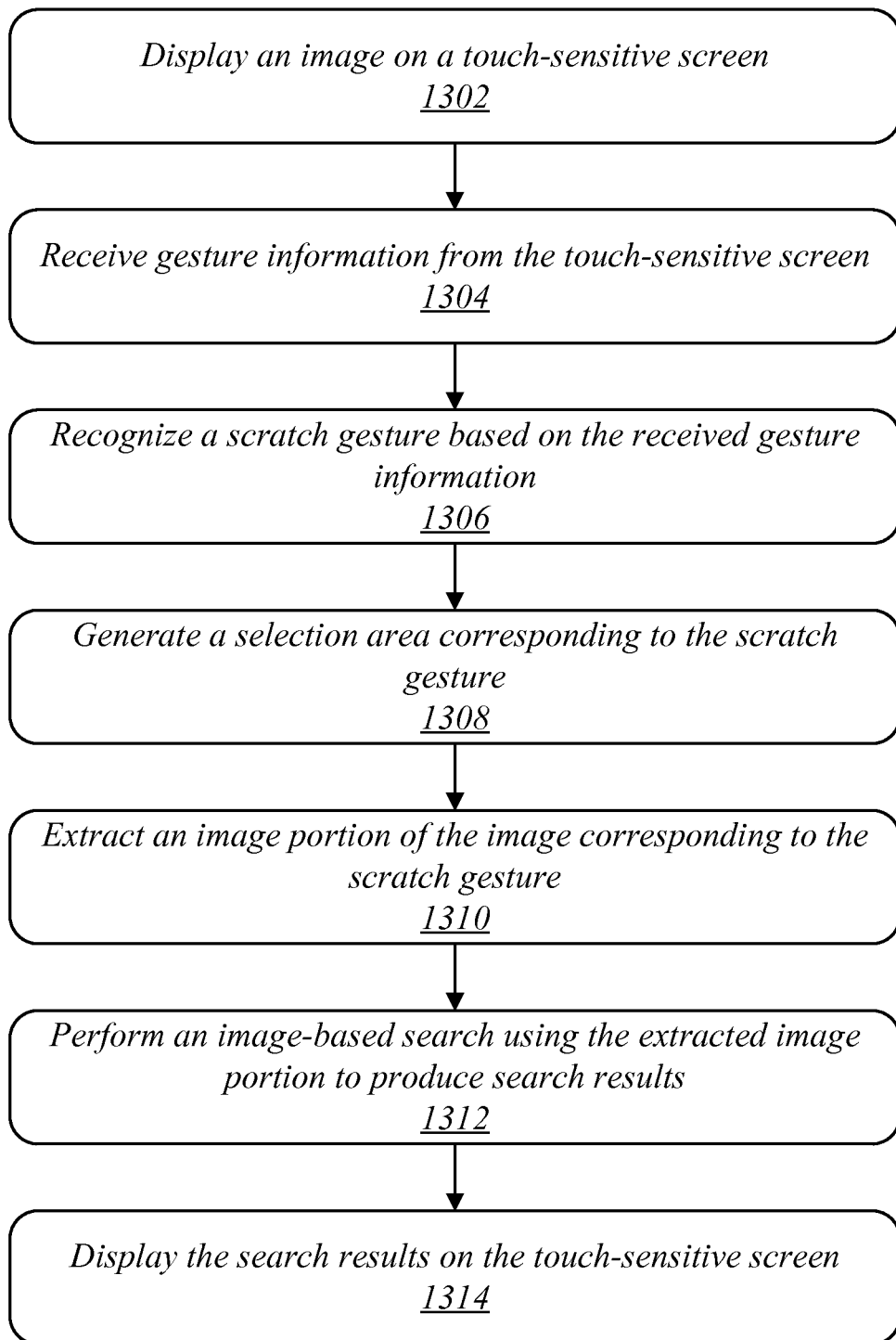
FIG. 13 illustrates an embodiment of a logic flow for the system of FIG. 1.

FIG. 13 illustrates one embodiment of a logic flow 1300. The logic flow 1300 may be representative of some or all of the operations executed by one or more embodiments described herein.

In the illustrated embodiment shown in FIG. 13, the logic flow 1300 displays an image 113 in a touch-sensitive screen 105 at block 1302. For example, the image 113 may comprise a frame from a video 220, the image 113 presented as part of a playback of the video 220. The embodiments are not limited to this example.

The logic flow 1300 may receive gesture information 120 from the touch-sensitive screen 105 at block 1304. For example, the gesture information 120 may comprise a plurality of touch-points swiped across the touch-sensitive screen 105. The embodiments are not limited to this example.

The logic flow 1300 may recognize a scratch gesture based on the received gesture information 120 at block 1306. For example, the scratch gesture may comprise a substantially-parallel substantially-simultaneous swipe of a plurality of touch-points downwards across the touch-sensitive screen 105. The embodiments are not limited to this example.

The logic flow 1300 may generate a selection area 125 corresponding to the gesture information at block 1308. For example, the selection area 125 may be generated corresponding to the recognized scratch gesture. The selection area 125 may be determined as a minimized rectangle bounding the screen area covered by the received gesture information. As such, a selection area 125 may be determined as a minimized rectangle bounding the scratch gesture The embodiments are not limited to this example.

The logic flow 1300 may extract an image portion 135 of the image 113 corresponding to the scratch gesture at block 1310. For example, the determined selection area 125 may be used to determine what portion of screen content is extracted. In some embodiments the image portion 135 contained within the determined minimized rectangle is extracted. The embodiments are not limited to this example.

The logic flow 1300 may perform an image-based search using the extracted image portion 135 to produce search results 145 at block 1312. For example, performing the image-based search may comprise composing an image-based search query 715 using the image portion 135, transmitting the composed image-based search query 715 to an image-based search system 720, and receiving intermediate search results 725 which are translated into search results 145. The embodiments are not limited to this example.

The logic flow 1300 may display the search results 145 using the touch-sensitive screen 105 at block 1314. For example, the search results 145 may comprise a plurality of search results consisting of a plurality of matching images found on the Internet. The search results 145 may comprise a plurality of search results consisting of a plurality of web pages found on the World Wide Web. The embodiments are not limited to this example.

Figure 14:
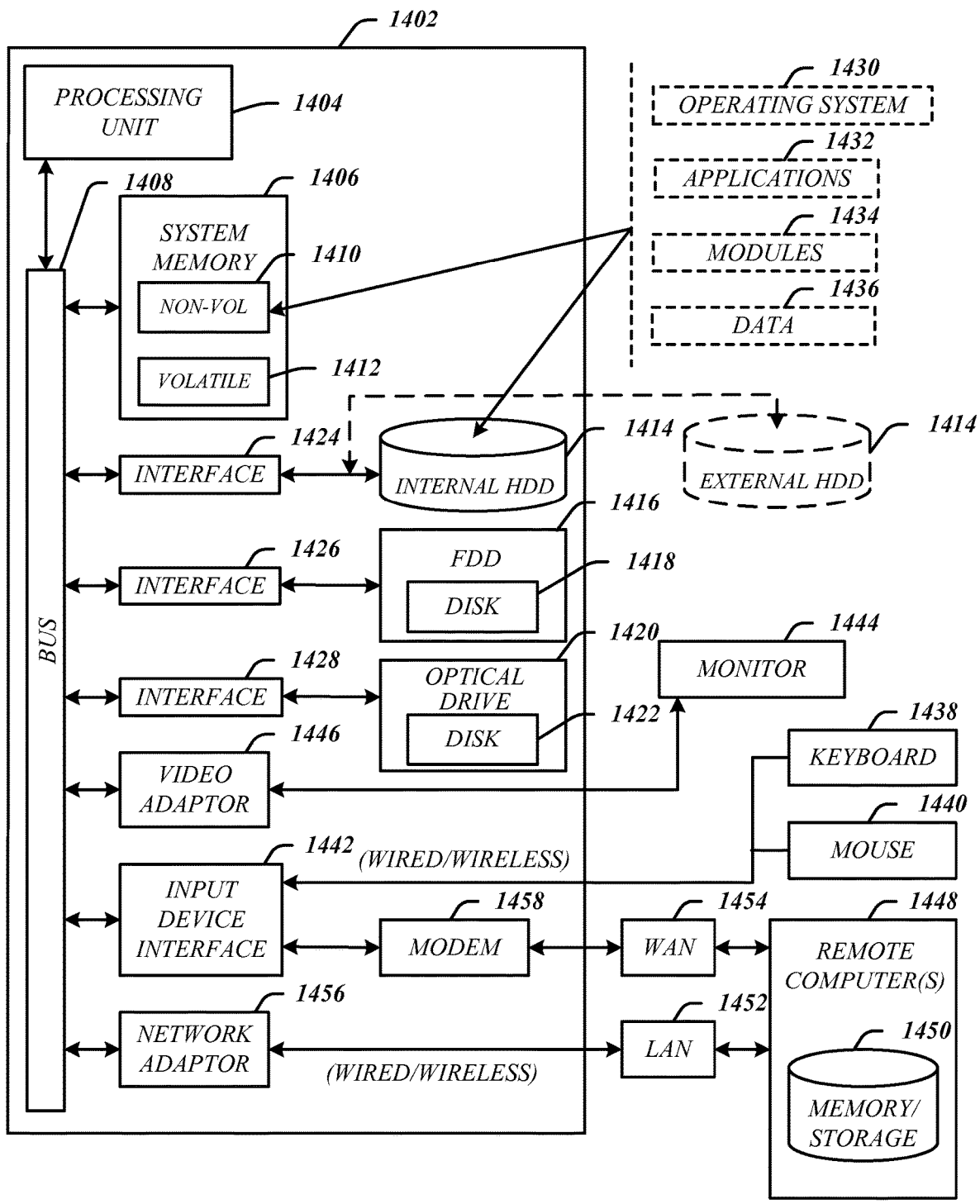
FIG. 14 illustrates an embodiment of a computing architecture.

FIG. 14 illustrates an embodiment of an exemplary computing architecture 1400 suitable for implementing various embodiments as previously described. In one embodiment, the computing architecture 1400 may comprise or be implemented as part of an electronic device. Examples of an electronic device may include those described with reference to FIGS. 2-4 and 8-11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1404.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436. In one embodiment, the one or more application programs 1432, other program modules 1434, and program data 1436 can include, for example, the various applications and/or components of the system 100.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.14 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.14x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
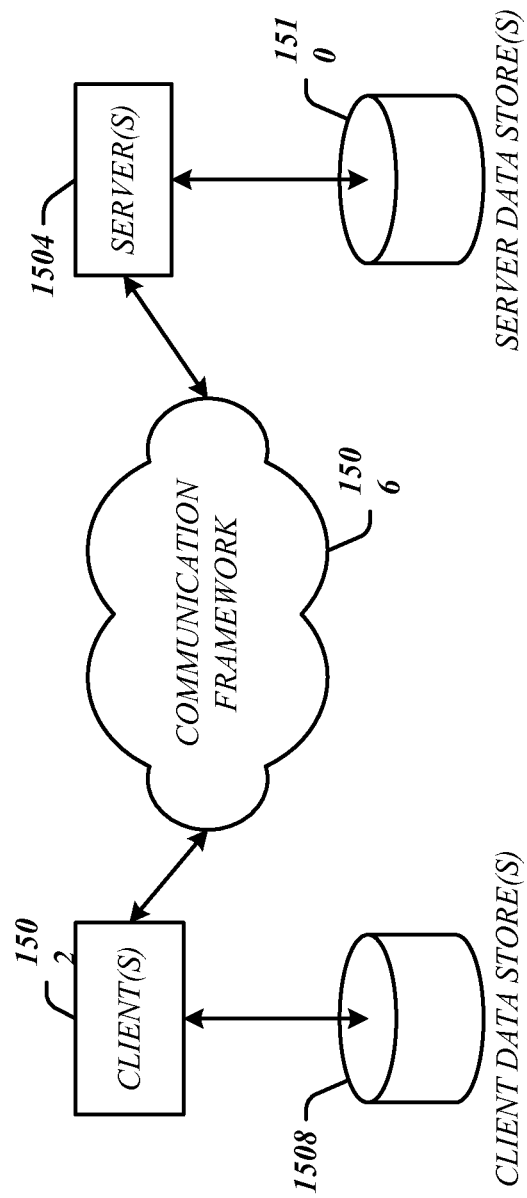
FIG. 15 illustrates an embodiment of a communications architecture.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 comprises includes one or more clients 1502 and servers 1504. The clients 1502 may implement the computing device 210. The servers 1504 may implement the image-based search system 720. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 may communicate information between each other using a communication framework 1506. The communications framework 1506 may implement any well-known communications techniques and protocols. The communications framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1502 and the servers 1504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In some embodiments, an apparatus may comprise a processor circuit; a gesture component operative on the processor circuit to receive gesture information from a touch-sensitive screen displaying an image and generate a selection area corresponding to the gesture information; a capture component operative on the processor circuit to extract an image portion of the image corresponding to the selection area; and a search component operative on the processor circuit to perform an image-based search using the extracted image portion.

Additionally or alternatively, the image may comprise a frame from a video, the image presented as part of a playback of the video.

Additionally or alternatively, the gesture component may be operative to recognize a scratch gesture based on the received gesture information.

Additionally or alternatively, the gesture component may be operative to generate the selection area corresponding to the scratch gesture.

Additionally or alternatively, the gesture component may be operative to determine the selection area as a minimized rectangle bounding the scratch gesture Additionally or alternatively, the capture component may be operative to extract the image portion contained within the determined minimized rectangle.

Additionally or alternatively, the scratch gesture may comprise a substantially-parallel substantially-simultaneous swipe of a plurality of touch-points downwards across the touch-sensitive screen.

Additionally or alternatively, the image may be displayed in combination with user interface elements.

Additionally or alternatively, the capture component may be operative to exclude the user interface elements from the extracted image portion.

Additionally or alternatively, the user interface elements may comprise elements surrounding the displayed image.

Additionally or alternatively, the capture component may be operative to exclude the user interface elements by constraining the selection area to a portion of the touch-sensitive screen corresponding to the displayed image.

Additionally or alternatively, the user interface elements may comprise elements overlaying the displayed image.

Additionally or alternatively, the capture component may be operative to exclude the user interface elements by extracting the image portion from a display buffer storing the image without the overlaid user interface elements.

Additionally or alternatively, the touch-sensitive screen may be operative to detect objects positioned on a surface of the touch sensitive screen.

In some embodiments, a computer-implemented method may comprise: displaying an image on a touch-sensitive screen; receiving gesture information from the touch-sensitive screen; generating a selection area corresponding to the received gesture information; extracting an image portion of the image corresponding to the selection area; performing an image-based search using the extracted image portion to produce search results; and displaying the search results on the touch-sensitive screen.

Additionally or alternatively, the image may comprise a frame from a video, the image presented as part of a playback of the video.

Additionally or alternatively, the method may comprise recognizing a scratch gesture based on the received gesture information.

Additionally or alternatively, the method may comprise generating the selection area corresponding to the scratch gesture.

Additionally or alternatively, the method may comprise determining the selection area as a minimized rectangle bounding the scratch gesture.

Additionally or alternatively, the method may comprise extracting the image portion contained within the determined minimized rectangle.

Additionally or alternatively, the scratch gesture may comprise a substantially-parallel substantially-simultaneous swipe of a plurality of touch-points downwards across the touch-sensitive screen.

Additionally or alternatively, the image may be displayed in combination with user interface elements.

Additionally or alternatively, the method may comprise excluding the user interface elements from the extracted image portion.

Additionally or alternatively, the user interface elements may comprise elements surrounding the displayed image.

Additionally or alternatively, excluding the user interface elements may comprise constraining the selection area to a portion of the touch-sensitive screen corresponding to the displayed image.

Additionally or alternatively, the user interface elements may comprise elements overlaying the displayed image.

Additionally or alternatively, excluding the user interface elements may comprise extracting the image portion from a display buffer storing the image without the overlaid user interface elements.

In some embodiments, at least one computer-readable storage medium may comprise instructions that, when executed, cause a system to: receive gesture information from a touch-sensitive screen displaying a video; generate a selection area corresponding to the received gesture information; extract an image portion of the video corresponding to the selection area; request an image-based search from an image-based search system based on the extracted image portion; and receive search results from the image-based search system.

Additionally or alternatively, the computer-readable storage medium may further comprise instructions that when executed cause the system to recognize a scratch gesture based on the received gesture information.

Additionally or alternatively, the computer-readable storage medium may further comprise instructions that when executed cause the system to generate the selection area corresponding to the scratch gesture.

Additionally or alternatively, the computer-readable storage medium may further comprise instructions that when executed cause the system to determine the selection area as a minimized rectangle bounding the scratch gesture.

Additionally or alternatively, the computer-readable storage medium may further comprise instructions that when executed cause the system to extract the image portion contained within the determined minimized rectangle.

Additionally or alternatively, the scratch gesture may comprise a substantially-parallel substantially-simultaneous swipe of a plurality of touch-points downwards across the touch-sensitive screen.

Additionally or alternatively, the image may be displayed in combination with user interface elements.

Additionally or alternatively, the computer-readable storage medium may further comprise instructions that when executed cause the system to exclude the user interface elements from the extracted image portion.

Additionally or alternatively, the user interface elements may comprise elements surrounding the displayed image.

Additionally or alternatively, the computer-readable storage medium may further comprise instructions that when executed cause the system to exclude the user interface elements by constraining the selection area to a portion of the touch-sensitive screen corresponding to the displayed image Additionally or alternatively, the user interface elements may comprise elements overlaying the displayed image.

Additionally or alternatively, the computer-readable storage medium may further comprise instructions that when executed cause the system to excluding the user interface elements by extracting the image portion from a display buffer storing the image without the overlaid user interface elements.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor; and
a memory coupled to the processor, the memory comprising instructions that when executed by the processor, cause the processor to:
receive an information element comprising an indication of a scratch gesture comprising a multiple swipe across two defined points of a touch sensitive screen based on detection of multiple touch-points by the touch sensitive screen, wherein each of the two defined points comprises an x-coordinate and a y-coordinate;
determine a bounding of an image based on the gesture; and
modify the image based on the bounding.

2. The apparatus of claim 1, the instructions, when executed by the processor cause the processor to set the modified image as a selection area.

3. The apparatus of claim 1, the instructions, when executed by the processor cause the processor to initiate an image search based on the modified image.

4. The apparatus of claim 3, the instructions, when executed by the processor cause the processor to:
receive an information element comprising an indication of the results of the image search; and
generate for display on a display coupled to the apparatus, the indication of the results of the image search.

5. The apparatus of claim 1, wherein the image is displayed on a display, the instructions, when executed by the processor cause the processor to determine the bounding as a rectangle, the rectangle having an area traversing a portion of the display.

6. A system comprising:
a display displaying an image;
a processor coupled to the display; and
a memory coupled to the processor, the memory comprising instructions that when executed by the processor, cause the processor to:
receive an information element comprising an indication of a scratch gesture, wherein the indication of the scratch gesture comprises a multiple swipe across at least two defined points of a touch sensitive screen based on detection of multiple touch-points by the touch sensitive screen, each of the two defined points comprising an x-coordinate and a y-coordinate;
determine a bounding of an image based on the gesture; and
modify the image based on the bounding.

7. The system of claim 6, the instructions, which when executed by the processor, cause the processor to set modified image as a selection area.

8. The system of claim 6, the instructions, when executed by the processor cause the processor to initiate an image search based on the modified image.

9. The system of claim 8, the instructions, when executed by the processor cause the processor to:
receive an information element comprising an indication of the results of the image search; and
generate for display on a display coupled to the apparatus, the indication of the results of the image search.

10. The system of claim 6, the instructions, when executed by the processor cause the processor to determine the bounding as a rectangle, the rectangle having an area traversing a portion of the display.

11. At least one non-transitory computer-readable storage medium comprising instructions that, when executed, cause a system to:

receive an information element comprising an indication of a scratch gesture, wherein the indication of the scratch gesture comprises a multiple swipe across at least two defined points of a touch sensitive screen based on detection of multiple touch-points by the touch sensitive screen, each of the two defined points comprising an x-coordinate and a y-coordinate;

determine a bounding of an image based on the gesture; and modify the image based on the bounding.

12. The at least one non-transitory computer-readable storage medium of claim 11, comprising instructions that when executed cause the system to set the modified image as a selection area.

13. The at least one non-transitory computer-readable storage medium of claim 11, comprising instructions that when executed cause the system to initiate an image search based on the modified image.

14. The at least one non-transitory computer-readable storage medium of claim 13, comprising instructions that when executed cause the system to:

receive an information element comprising an indication of the results of the image search; and generate for display on a display coupled to the apparatus, the indication of the results of the image search.

15. The at least one non-transitory computer-readable storage medium of claim 11, wherein the image is displayed on a display, the medium comprising instructions that when executed cause the system to determine the bounding as a rectangle, the rectangle having an area traversing a portion of the display.

* * * * *